Patented Feb. 11, 1930

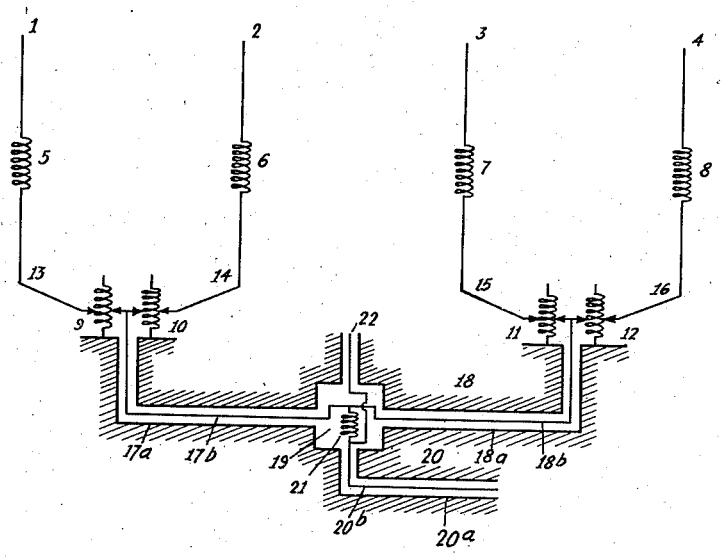

1,746,389

UNITED STATES PATENT OFFICE

CHARLES SAMUEL FRANKLIN, OF BUCKHURST HILL, ESSEX, ENGLAND, ASSIGNOR TO RADIO CORPORATION OF AMERICA, A CORPORATION OF DELAWARE

DIRECTIONAL AERIAL SYSTEM AND FEEDING SYSTEM THEREFOR

Application filed October 15, 1927, Serial No. 226,292, and in Great Britain October 19, 1926.

This invention relates to directional aerial systems and feeding systems therefor, and is an improvement in or modification of the invention set forth in my U. S. application No. 719,486, filed June 12, 1924.

In the said prior application is described an aerial system erected in a plane at right angles to the direction of transmission, and comprising a plurality of vertical rods or wires spaced a fraction of a wave length apart. The system is energized from a common source at points (preferably half a wave length apart) so that the currents in all the vertical rods or wires are in phase with one another.

In such an aerial system, energized at a number of points, it is not necessary that horizontal connections between the upper ends and between the lower ends of the vertical rods or wires be continuous right across the aerial system it being necessary only that those rods or wires directly associated with the same feeding point be connected together.

One of the objects of this invention is to simplify the feeder system used with this type of aerial.

Another object of my invention is to increase the directiveness and efficiency of this type of aerial.

A third object of my invention is to eliminate reflection back along the feeder branches and main feeder.

Other objects and advantages will become apparent from the accompanying drawing in which the single figure shows diagrammatically in elevation an aerial arrangement including the feeder system therefor constructed in accordance with my invention.

According to this invention a directional aerial system comprises a plurality of substantially vertical aerials spaced apart horizontally by not more than one half wave length, the aerials being associated singly or in pairs with a feeder system so that the currents in all the aerials are in phase with one another or in a predetermined phase relationship with one another.

In one form of construction, an aerial system comprises a plurality of substantially vertical aerials, spaced apart by one half wave length and provided at their lower ends with tails of wire of equal length, by means of which they are connected in pairs to a plurality of feeding points of a feeder system, such as that described in my above referred application, so that currents in all the aerials are in phase.

In another form of construction, the aerial system comprises a plurality of substantially vertical aerials supplied with currents in the same phase, each aerial being connected at its lower end through a tail of wire to the coil of an aerial feeding auto-transformer. Variable feeding tapping points are provided upon these coils and the tappings associated with each pair of neighboring aerials connected together and to a branch of the feeder system. Each neighboring pair of such feeder branches is connected together at a junction box and to a further branch of the feeder system. Such further branches are similarly connected together in pairs to other feeder branches, which are similarly connected together in pairs.

Thus, the feeder system comprises a main feeder supplied from the source of energy and bifurcating into branch feeders which again bifurcate and so on, until the aerial system is reached. The feeder branches are balanced as regards their surge impedance and electrical characteristics, so that reflection is substantially eliminated.

Referring more particularly to the drawings, the aerial system comprises four substantially vertical aerials 1, 2, 3, 4, spaced not more than one half wave length apart in a plane substantially at right angles to the direction of transmission. Each aerial is preferably long as compared with the wave length and alternate half wave lengths thereof are so formed that radiation therefrom is suppressed or substantially reduced for example, by constructing the said alternate half wave lengths as inductance coils 5, 6, 7, 8. Such aerials are described in my U. S. application No. 47,232, filed July 31, 1925.

The lower ends of the aerials 1, 2, 3, 4, are connected through tails or connectors 13, 14, 15, 16, to variable tapping points upon inductances 9, 10, 11, 12, which may, if desired, be earthed and which are in turn connected through high frequency branch cables 17 and 18 to a junction box 19, whence a further main cable 20 leads to the transmitter or receiver, as the case may be. The cables 17, 18, 20 are preferably as described in the specification accompanying my British application No. 26,080 of 1926, and comprise an outer tubular conductor earthed throughout its length (17ª, 18ª, 20ª,) within which is a concentrically arranged conductor (17ᵇ, 18ᵇ, 20ᵇ,) substantially air insulated from the outer conductor and supported therefrom by insulators located at different points in its length. The cables 17 and 18 are preferably equal so that currents at the junction box 19 do not suffer relative phase displacement, due to the cables 17 and 18. If relative phase displacement is desired, however, the cables 17 and 18 may be of different length.

The junction at 19 is effected, for example, by means of an inductance 21 and condenser 22 (which latter may be constituted by a length of high frequency cable) and the whole arrangement should be such that the effective resistance of the cables 17 and 18 in parallel at the junction 19, is substantially equal to the surge impedance of the cable 20, while the effective resistances imposed by the aerials 1, 2, 3, 4, and tails 13, 14, 15, 16 at the terminals of the cables 17, 18 are substantially equal to the surge impedances of the said cables, so that reflection of energy may be reduced to a minimum.

It will be seen that with the constructions hereinbefore described, no upper horizontal wires are employed in the aerial system, and the lower horizontal wires are replaced by simple tails of wire, an arrangement which enables the construction of the said aerial system to be considerably simplified.

Having now fully described and illustrated my invention what I claim is:

1. An aerial system for directional wireless telegraphy and telephony including, a plurality of pairs of spaced vertical wires which are open at one end, a plurality of branch cables each of which is symmetrically connected to the other ends of one of said pairs of vertical wires, and a main cable symmetrically coupled to said branch cables.

2. An aerial system for directional wireless telegraphy and telephony including, a plurality of pairs of spaced vertical wires which are open at one end, a plurality of branch cables having predetermined relative electrical length, each of which is symmetrically connected to the other ends of one of said pairs of wires, a main cable the surge impedance of which has a predetermined value relative to the effective resistance of the main cable in parallel connected to said branch cables, and means to match their surge impedances.

3. An aerial system for directional wireless telegraphy or telephony including, a plurality of pairs of spaced vertical radiating members which are open at one end, a plurality of electrically equal branch cables each of which is symmetrically connected to the other ends of one of said pairs of vertical members, and a main cable symmetrically coupled thereto, the surge impedance of which is appropriately matched to the effective resistance of the branch cables in parallel connected to said branch cables.

4. In a directive aerial system, a plurality of pairs of vertical wires which are open at their upper ends, a branch cable for each pair of wires, a pair of tapped inductances at the terminal of each cable, a connector for each of said vertical wires connecting the lower end of said wire to one of said inductances, and a main cable symmetrically connected to all of said branch cables.

5. In a directive aerial system, a plurality of spaced pairs of spaced vertical wires which are open at their upper ends, a plurality of branch cables, a plurality of pairs of connectors connecting the lower ends of each of said pairs of vertical wires to one of said branch cables, a main cable, and means including an inductance and capacitance for connecting said main cable to said branch cables and for matching their surge impedances.

6. An aerial system comprising a plurality of substantially vertical aerials spaced apart horizontally by not more than one half wave length, the said aerials being open at their upper ends and associated at their lower ends with a symmetrically branched feeder system, so that the currents in all the aerials are in a predetermined phase relationship with one another.

7. The method of simplifying the feeder systems of antennæ employing a plurality of radiators fed cophasally by symmetrically branched feeder lines which includes grounding each of the radiators to make possible use of a ground return feeder system.

8. A directional antenna system comprising a plurality of spaced vertical wires which are open at their upper ends and grounded through autotransformer inductances at their lower ends, and a symmetrically branched feeder system having a grounded return, said feeder system being terminated by connections to the various autotransformers, at one end, and to radio apparatus at its other end.

9. A directional antenna system comprising a plurality of spaced vertical radiators which are open at their upper ends, and which are connected by pairs of wire tails of equal length at their lower ends to grounded autotransformer inductances located symmetrically with respect to the respective pairs of radiators, a symmetrically branched feeder system having a grounded return and terminating at one end by connections to the autotransformers, and at its other end by connection to radio apparatus.

10. A directional antenna system comprising a plurality of spaced vertical radiators each including several half wave length portions connected by nonradiating phase reversing reactances, said radiators being open at their upper ends, and grounded at their lower ends through wire tails of equal length connecting the radiators to autotransformer coils symmetrically located with respect to the respective pairs of radiators, a symmetrically branched feeder system having a grounded return and terminating at one end by connections to the autotransformers, and at the other end by connection to radio apparatus.

CHARLES SAMUEL FRANKLIN.